Figure 1:
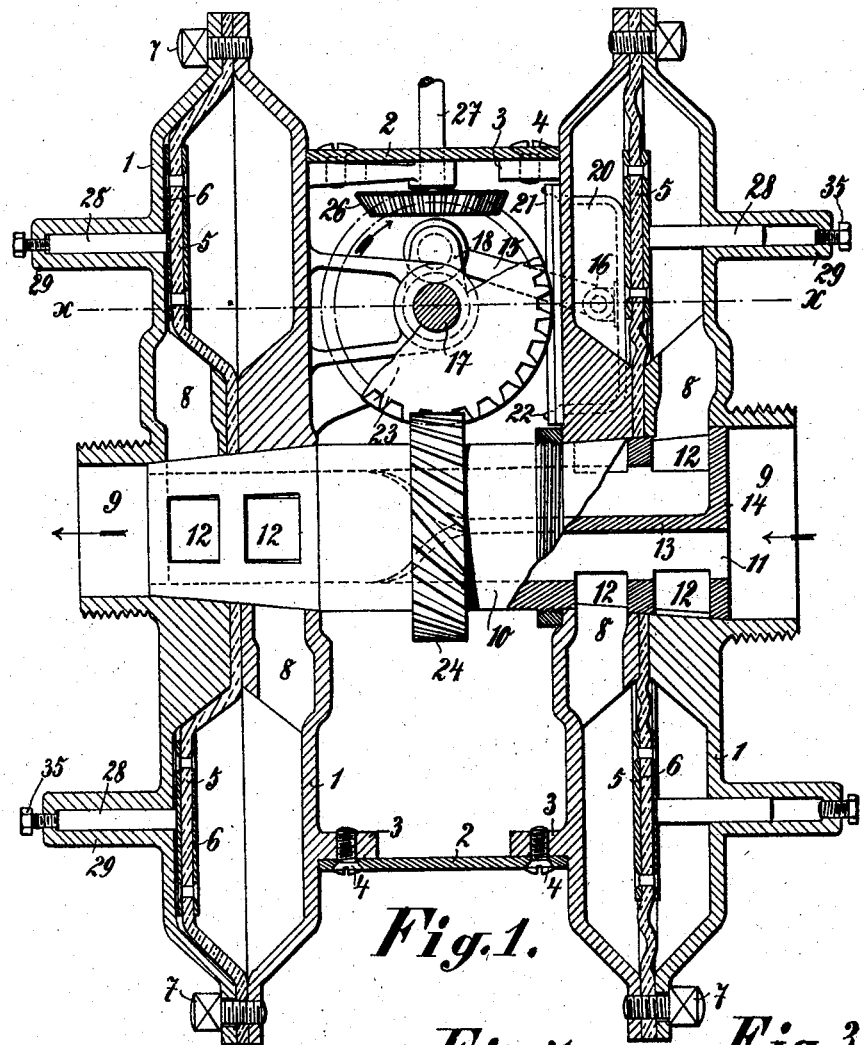

No. 806,541. PATENTED DEC. 5, 1905.
W. HAGSPIEL.
LIQUID METER.
APPLICATION FILED MAY 25, 1905.

4 SHEETS—SHEET 1.

Witnesses:

Inventor
Wilhelm Hagspiel

No. 806,541. PATENTED DEC. 5, 1905.
W. HAGSPIEL.
LIQUID METER.
APPLICATION FILED MAY 25, 1905.

4 SHEETS—SHEET 2.

Witnesses: Inventor
Wilhelm Hagspiel

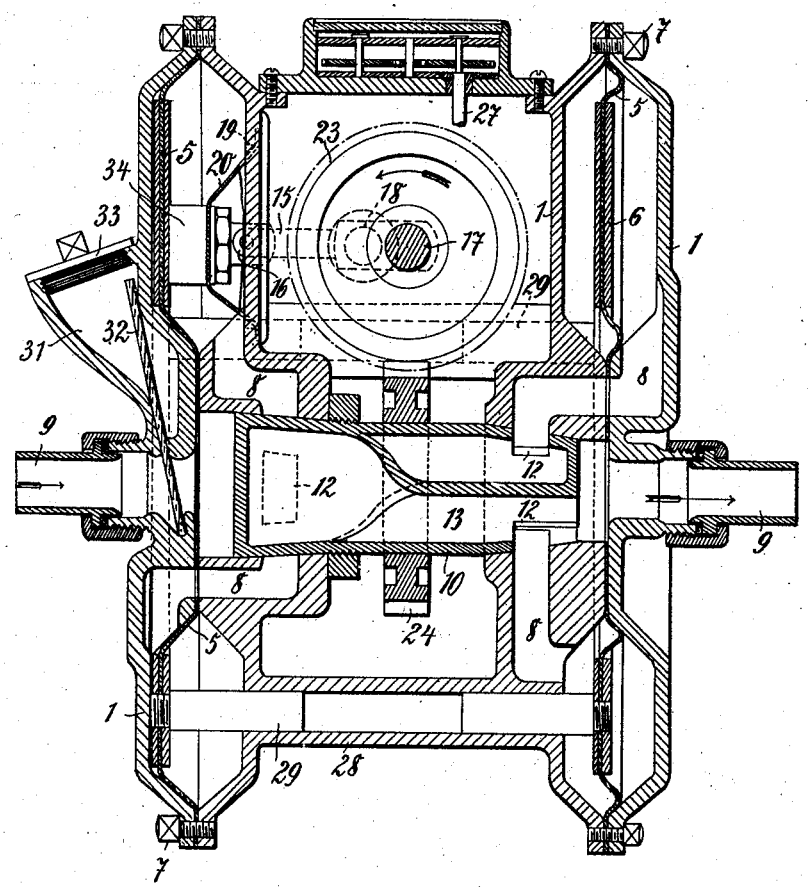

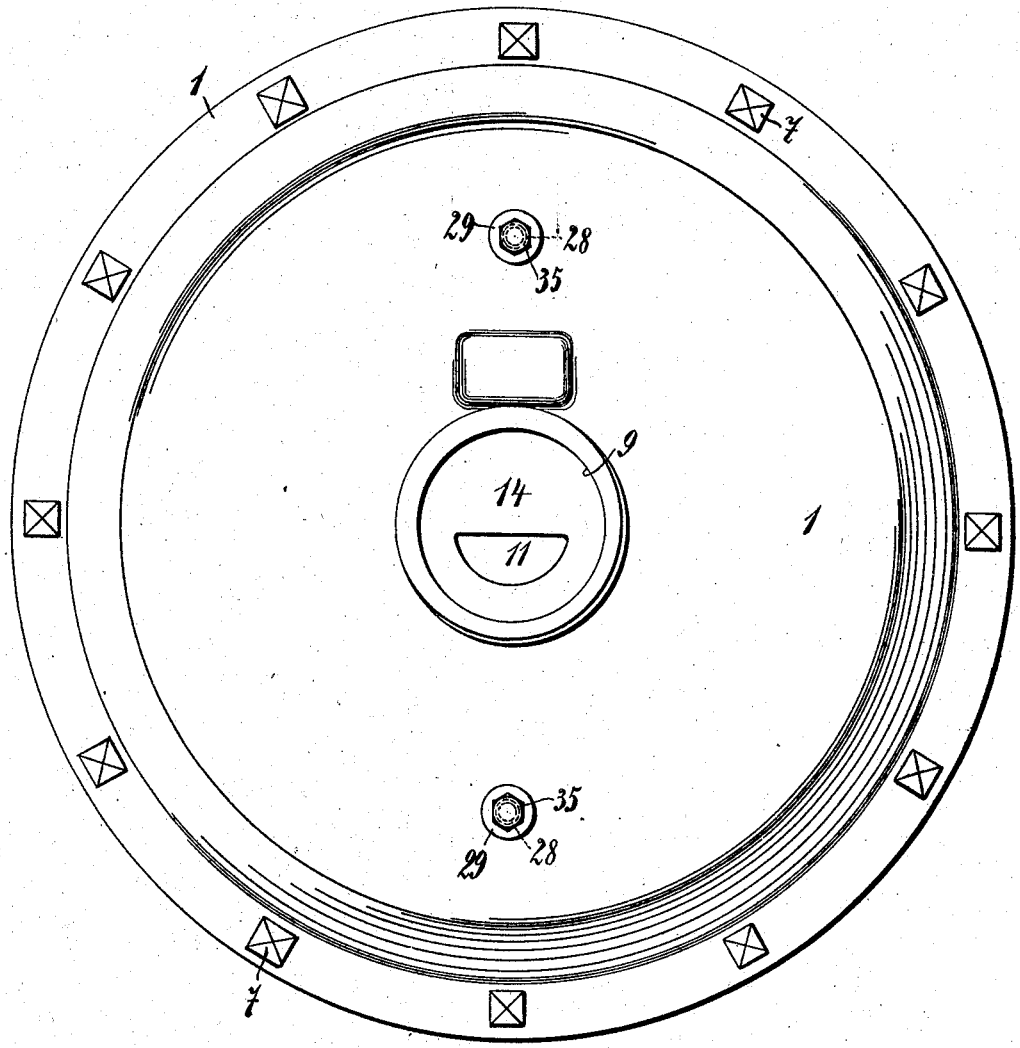

UNITED STATES PATENT OFFICE.

WILHELM HAGSPIEL, OF LUDWIGSBURG, GERMANY.

LIQUID-METER.

No. 806,541. Specification of Letters Patent. Patented Dec. 5, 1905.

Application filed May 25, 1905. Serial No. 262,259.

*To all whom it may concern:*

Be it known that I, WILHELM HAGSPIEL, engineer, of Imbroderstrasse 10 and 12, Ludwigsburg, Germany, have invented certain new and useful Improvements in Liquid-Meters, the Pistons of Which Consist of Annular Diaphragms, of which the following is a clear and perfect description.

This invention relates to a meter for measuring the volume of liquids and fluids in which a diaphragm is actuated by the liquid to be measured, the movements of this diaphragm being transmitted, by means of a piston-rod, in the usual manner to the shaft, by which the counting apparatus is actuated.

Liquid-meters in which the diaphragm acts as the piston have heretofore usually been provided with two diaphragms, the action of which is similar to that of the two pistons of a double-acting pump. In the present invention these diaphragms, which hitherto have always been of circular shape, are formed by annular plates, the outer and inner edges of which are attached to the sides of correspondingly-shaped annular casings. By adopting this form of constructing the apparatus a hollow space is created in the center of the casings containing the diaphragm, which is best employed for harboring the distributing mechanism. Moreover, the supply and discharge of the liquid to be measured takes place in the axial direction and the frictional resistance offered to the liquid is at the same time very considerably diminished and the whole mechanism is very much simplified, with the result that the liquid-meter can be fitted without any difficulties whatever. The piston-diaphragms themselves may be in the form of circular or elliptic rings or of rings having any desired shape. The hollow spaces in the interior of these rings may be arranged either concentrically or eccentrically. Consequently the reversing-gear or the distributing mechanism may be arranged either concentrically or eccentrically in the interior of these rings.

The distributing mechanism used in connection with the new liquid-meter consists of a tubular rotary valve with axially-arranged inlets and outlets for the liquid. The interior of this tubular valve is divided into two halves by means of a partition which simultaneously covers half of each end of the tubular valve and is twisted through a right angle, so that the inlets and outlets for the liquid of one half of the distributing mechanism in relation to those of the other half and the two ends of the partition in relation to each other are displaced ninety degrees.

As it is not possible to make the diaphragms so accurate as to insure that the amount of liquid flowing through the cylinder or the apparatus at each revolution of the shaft shall always be the same and represent a previously-determined quantity and as, moreover, even a small inaccuracy in the action of the diaphragms must result in making the amount of the liquid actually passing through the apparatus much larger than the amount indicated by the counting mechanism, especially when the apparatus has been in use for a considerable time, the apparatus has been provided with a device for regulating the amount of the liquid coming through by means of which the stroke of the piston-diaphragm can be so adjusted as to allow only a fixed quantity of liquid to pass through the apparatus at each revolution of the main shaft.

In the annexed drawings two different forms of constructing the apparatus are illustrated by way of example.

Figure 4:
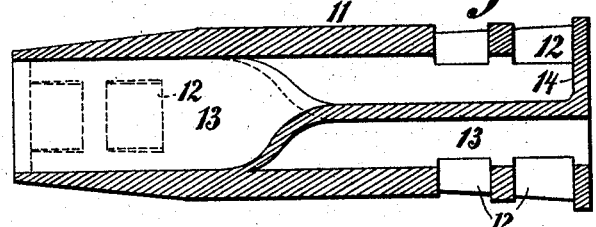
Figure 3:
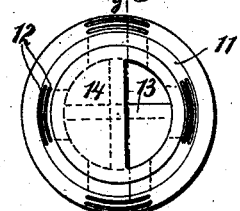
Figure 2:
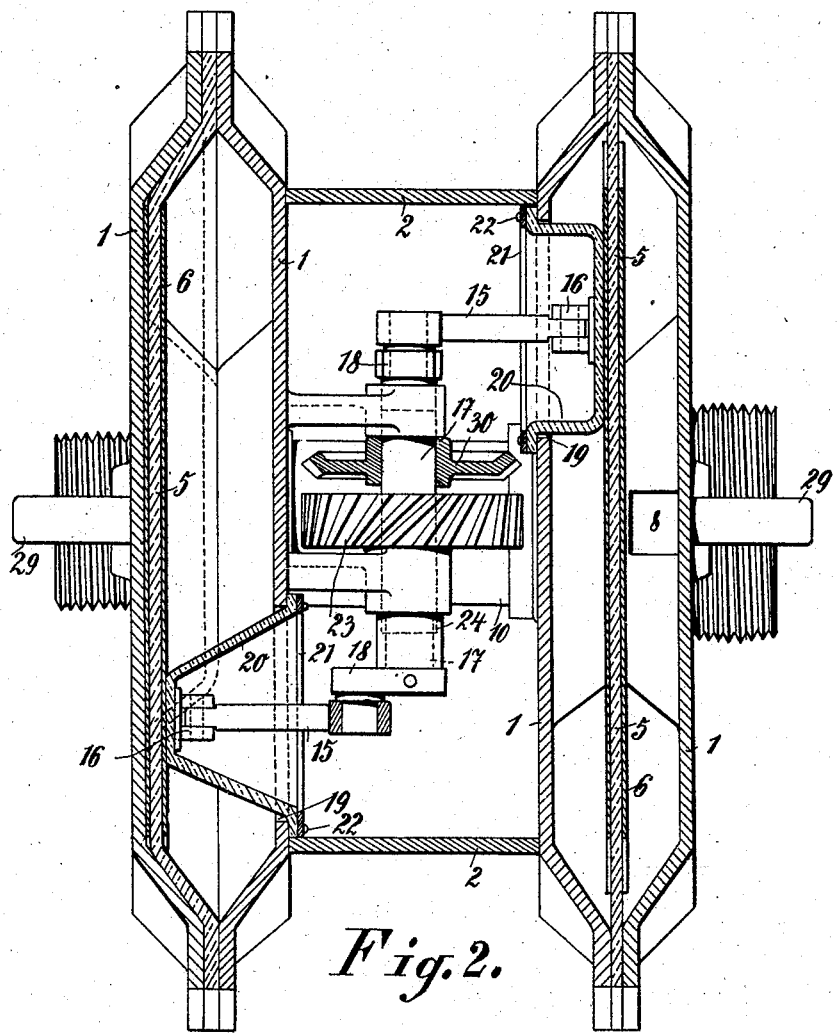
Figure 5:
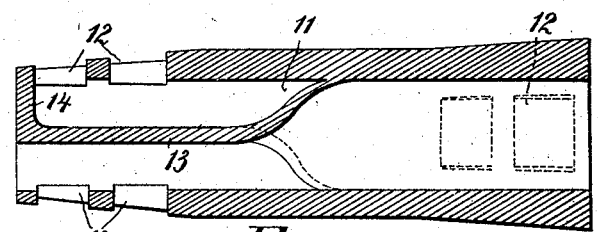

Figure 1 is a vertical section through the liquid-meter with the distributing apparatus arranged in the central axes of the piston-diaphragms. Fig. 2 is a horizontal section of Fig. 1 on the line X X. Fig. 3 is a front elevation of the distributing mechanism. Fig. 4 is a longitudinal section through the distributing mechanism on the line Y Y of Fig. 3. Fig. 5 is a section similar to that shown in Fig. 4, but displaced ninety degrees. Fig. 6 is a vertical section through a modification of the liquid-meter illustrated in the preceding drawings, in which the distributing mechanism is arranged eccentrically in the interior of the piston-diaphragm. Fig. 7 is an end view of the meter.

In the annular casings 1, each of which is divided into two halves, diaphragms 5, covered with metal plates 6, are so attached to the casings 1 by their inner and outer circumferences as to be capable of oscillating to and fro. The cylindrical casings 1 are provided on the inside with annular flanges 3 and are connected with the casings 2 by means of screws 4. The diaphragms 5 are maintained in position by means of the screws 7, by which the two halves of the cylindrical casing are fastened to each other. In each annular cylinder 1 two apertures 8, leading into the inner hollow spaces 9, are arranged in such a manner that one of them is situated on the one side and the other on the other side of the diaphragm.

The distributing mechanism 10 for the liquid is arranged within the hollow space 9. It consists in the case of the apparatus under consideration of a tubular rotary valve 11, provided with eight apertures 12, corresponding to the apertures 8. All the apertures which correspond to those of one of the diaphragm-cylinders are situated on the same side of the tubular rotary valve, while those that correspond to the apertures of the other cylinder are situated at an angle of ninety degrees in relation to the others. A partition 13, which divides the tubular rotary valve 11 into two parts, is twisted through ninety degrees and is bent at right angles, so as to form two walls 14, which each cover one-half of the inlet and outlet ends of the tubular rotary valve and which in consequence of the twisting of the partition are displaced through an angle of ninety degrees in relation to each other. The arrangement advocated insures that the piston-diaphragms are so operated that each of them is at its most effective position when the other is at its dead-point. Moreover, by arranging the diaphragms in the manner of the pistons of a double-acting pump at least a section of them must always be in full action. The diaphragms are not, as has heretofore always been the case, connected with the shaft actuating the counting mechanism by means of piston-rods or connecting-rods, but by means of a crank-shaft 15, which actuates the crank 18 of the main shaft 17. The crank-shaft 15 is attached to the diaphragms 5 by hinges 16 and moves in a recess 19 of the cylindrical casing. The liquid is prevented from running out of the casing by a diaphragm 20, which covers the recess 19 and one end of which is attached to the casing 1 by a ring 21 and screws 22, while the other end of it is fixed between the hinge 16 and the diaphragm 5. As is shown in Fig. 2, the diaphragm 20 must oscillate in a manner that corresponds to the movements of the crank-shaft 15 and the piston-diaphragms 5.

The distributing mechanism 10 is driven from the main shaft by means of a pair of helical tooth-wheels of equal diameter. For this purpose the tooth-wheel 23, which engages with the tooth-wheel 24, mounted on the tubular rotary valve 10, is mounted on the main shaft 17. Moreover, a bevel-wheel 30, which is in engagement with the bevel-wheel 26, actuating the shaft 27 of the counting mechanism, is likewise mounted on the main shaft 17.

To insure the proper movements of the diaphragms 5 when oscillating, pins 28, which move in cylindrical projections 29, attached to the casings 1, are fixed to the piston-diaphragms 5 in the usual manner.

Fig. 6 shows a different form of constructing the distributing mechanism. In this instance the pistons are formed of eccentric rings and not of concentric rings, as in the apparatus already described. A hinged piece 34, with which the main shaft 15 engages, is fixed to the piston-diaghragm 5. The cylindrical part of the hinged piece 34 enables the small diaphragm 20 to oscillate to the same extent in both directions. A mud-catch 31, which is closed by the screw 33 and in which a removable sieve 32 is arranged, is fixed to the inlet-pipe of the casing 1. The sieve 32 serves to prevent solid and like particles from entering the apparatus, and thereby avoid destroying the working or operation of the latter. After unscrewing the cover 33 the sieve 32 may be taken out for cleaning or repairing purposes. The particles that have a tendency to enter the apparatus collect in a space adjacent to the lower extremity of the sieve.

Finally, regulating devices—for instance, screws 35, by means of which the height of the stroke of the diaphragm can be regulated as required—are attached to the guides 29 of the guide-pistons 28 of the diaphragms 5.

The apparatus is operated as follows: When the different parts of the apparatus are all in the position shown in Fig. 1, the liquid, which flows through the meter in the direction indicated by the arrows, enters the distributing mechanism from the right, passes through the lower aperture 8 into the right cylinder and forces the diaphragm to the right, whereupon the whole quantity of liquid in this cylinder enters the distributing mechanism through the upper aperture 8 and flows from thence into the left cylinder. While the parts of the apparatus are in this position the apertures 8 of the left cylinder remain closed. The pressure of the entering water actuates not only the right piston-diaphragm but also the main shaft 17, the rotation of which will rotate the distributing mechanism through a right angle and cause it to assume the position shown in Fig. 5, in which both the apertures of the right diaphragm-cylinder are closed while there is a free passage from the apertures of the left diaphragm-cylinder to the distributing mechanism. Consequently the liquid which fills the left half of the left cylinder must force the liquid which fills the right half of the left cylinder to flow into the distributing mechanism. If the latter is again rotated through a right angle, the liquid will pass through the upper aperture of the right cylinder into the right half of this cylinder and will force the water to run out of the left half of the cylinder, &c.

Having now particularly described and ascertained the nature of my said invention and in what manner the same is to be performed, I declare that what I claim is—

1. In a liquid-meter, annular casings and pistons consisting of annular diaphragms disposed in the interior of the casings and attached to the latter.

2. In an apparatus of the class set forth, the combination of a liquid-meter consisting of a plurality of piston-diaphragms for measuring the volume of liquids, and distributing mechanism provided with axially-arranged inlets and outlets, the measuring operation of the meter being effected in the space around the pistons.

3. A distributing mechanism comprising a liquid-meter having piston-diaphragms for measuring volumes of liquid, a tubular rotary valve with axially-arranged inlets and outlets for the liquid to be measured, and a partition dividing the tubular rotary valve into two halves and covering simultaneously one-half of each end of the tubular valve, said partition being twisted through a right angle so that the inlets and outlets for the liquid of one half of the distributing mechanism in relation to the other half and the two ends of the partition in relation to each other are displaced ninety degrees.

In testimony whereof I have hereunto set my hand in presence of two subscribing witnesses.

WILHELM HAGSPIEL.

Witnesses:
PAUL GOLDSCHMIDT,
ERNST ENTENMAS.